(12) United States Patent
Walker

(10) Patent No.: US 6,179,892 B1
(45) Date of Patent: Jan. 30, 2001

(54) METHOD AND COMBINATION FOR INCREASING PLANT PRODUCTIVITY

(76) Inventor: John Davies Walker, 1779 W. 190 South, Rexburg, ID (US) 83440

(*) Notice: Under 35 U.S.C. 154(b), the term of this patent shall be extended for 0 days.

(21) Appl. No.: 09/249,286

(22) Filed: Feb. 10, 1999

(51) Int. Cl.$^7$ .................................................. C05F 11/00
(52) U.S. Cl. .................................................. 71/11; 71/23
(58) Field of Search ............................................ 71/11, 23

(56) References Cited

U.S. PATENT DOCUMENTS 5,861,048 * 1/1999 Kamasaka et al. ...................... 71/11

FOREIGN PATENT DOCUMENTS

| | | | |
|---|---|---|---|
| 2 764 879 | * | 12/1998 | (FR) . |
| 2 195 993 | * | 4/1988 | (GB) . |
| 1-117807 | * | 5/1989 | (JP) . |
| 10-338586 | * | 12/1998 | (JP) . |
| 1130196 | * | 12/1984 | (SU) . |

OTHER PUBLICATIONS

Ege, Organic Chemistry Structure and Reactivity, 1994, p. 1125 and 1177.*

* cited by examiner

*Primary Examiner*—Steven P. Griffin
*Assistant Examiner*—Elin A Warn
(74) *Attorney, Agent, or Firm*—Tod R. Nissle P.C.

(57) ABSTRACT

A method produces surprising results by increasing the yield of a plant. The method includes the step of foliarly applying crystalline birefringent raw starch granules. The granules are applied under selected temperature, moisture, and sunlight conditions and during a selected period of time prior to row closure.

3 Claims, No Drawings

METHOD AND COMBINATION FOR INCREASING PLANT PRODUCTIVITY

This invention relates to plants.

More particularly, the invention relates to a method for improving the yield of a healthy plant.

In a further respect, the invention relates to a method for utilizing crystalline, birefringent starch granules to achieve surprising and unexpectedly high increases in the yield of plants.

In another respect, the invention relates to a method for utilizing starch granules which can, since the use of starch to consistently increase the yield of crops is either non-existent or insignificant, result in the creation of a widespread new use for starch.

In a further respect, the invention relates to a method for significantly increasing the yield of plants at a cost which is much less than that associated with many or all conventional fertilizers and other growth enhancers.

Millions of dollars are spent annually by farmers to apply fertilizer, pesticides, and other chemicals which enhance the growth of plants.

Attempts have been made to utilize starch to enhance the growth of plants. A particular advantage of using starch is its comparatively low cost. Starch granules have been added to the top of soil around the base of plants and have been inserted or worked into the ground near the roots of plants. The results associated with such applications of starch to the ground have been inconsistent. Farmers will not pay for or go to the trouble of applying starch because the results are unpredictable. Despite long existing claims that starch does or should work, the failure of starch as a growth enhancer is readily demonstrated by the fact that there is no significant market or distribution network for selling starch to be applied to plants. Nor is there a brand name starch product for use to enhance the growth of plants. If a significant demand for starch existed, the companies which produce starch promptly would take advantage of such a demand. There appears to have been absolutely no such demand for at least the last five decades.

In the mind of most, if not all, farmers, starch is unpredictable and, therefore, is worthless.

The starch industry itself seems to be somewhat secretive and only reluctantly disseminates information concerning starch.

Another problem associated with applying fertilizers or other chemical compounds to plants is the use of the terms growth and productivity. A statement often heard is that using a particular product increases the growth and productivity of a plant. While such a statement may be true with respect to a particular product, it can be misleading and constitute a statement of omission for the following reasons.

First, the growth of a plant includes a vegetative growth period and a reproductive growth period. The vegetative growth period precedes the reproductive growth period. During the reproductive growth period, buds and flowers form on the plant, "set", and develop into fruit.

Second, enhancing the vegetative growth of a plant does not always result in increasing the number or size of fruit produced by the plant. For example, applying excessive amounts of nitrogen to a plant can cause a plant to grow vegetatively for a longer than normal period of time. Also, simply making a plant grow faster can be called "increasing the growth" of the plant. But making a plant grow faster does not mean that the plant will necessarily produce an increased number or size of fruit.

Third, enhancing the reproductive growth of a plant does not always result in increasing the yield of a plant. For example, causing a plant to produce an excessive number of flowers may result in a large quantity of smaller-than-normal fruit, or may cause a large portion of the flowers not to set.

Fourth, some assume that if, after a fertilizer or other "growth" enhancing chemical compound is applied, a plant does not grow faster look bigger or look greener or have more leaves or produce more flowers then the fertilizer "does not work". This can be a misleading position to take.

It can be argued that the real issue is whether the yield of a plant is improved. Use of the general terms growth and productivity does not necessarily address this specific issue. Increasing growth and productivity does not necessarily increase the yield of a plant.

In accordance with the invention, I have discovered a new method which significantly, predictably and consistently increases the yield of a plant. The method treats a stand of plants growing by natural processes and exposed to direct sunlight and an atmosphere of air to improve the yield of the plants. The plants each include at least one leaf including a plurality of epidermal cells; a plurality of stomata for allowing carbon dioxide to enter the leaf; a plurality of food-making cells, each food-making cell including a plurality of chloroplasts; a plurality of air spaces each adjacent at least one of the food-making cells; carbon dioxide in each of the air spaces; water vapor in each of the air spaces; xylem for carrying water; and, phloem for carrying food produced by the leaf. The method includes the step of applying a plurality of solid crystalline optically birefringent starch granules. The granules are applied foliarly to contact the epidermal cells.

In another embodiment of the invention, I provide a method for treating a stand of plants growing by natural processes, exerting less than six atmospheres of pressure to draw water from the ground, and exposed to direct sunlight and an atmosphere of air having an ambient temperature in the range of 65 degrees F. to 105 degrees F. to improve the yield of the plants. Each of the plants includes at least one leaf including a plurality of epidermal cells; a plurality of stomata for allowing carbon dioxide to enter the leaf; a plurality of food-making cells, each food-making cell including a plurality of chloroplasts; a plurality of air spaces each adjacent at least one of the food-making cells; carbon dioxide in each of the air spaces; water vapor in each of the air spaces; xylem for carrying water; and, phloem for carrying food produced by the leaf. The method includes the step of applying foliarly to contact said epidermal cells with a plurality of solid crystalline optically birefringent starch granules to said plants exerting less than six atmospheres of pressure to draw water from the ground and naturally growing in said stand exposed to said direct sunlight and said atmosphere having an ambient temperature in the range of 65 degrees F. to 105 degrees F.

In a further embodiment of the invention, I provide a method for treating a stand of plants growing by natural processes and exposed to sunlight and an atmosphere of air to improve the yield of the plants. Each of the plants includes at least one leaf including a plurality of epidermal cells; a plurality of stomata for allowing carbon dioxide to enter the leaf; a plurality of food-making cells, each food-making cell including a plurality of chloroplasts; a plurality of air spaces each adjacent at least one of the food-making cells; carbon dioxide in each of the air spaces; water vapor in each of the air spaces; xylem for carrying water; and, phloem for carrying food produced by the leaf. The method comprises the step of, less than five weeks before row closure, applying foliarly to contact the epidermal cells with a plurality of solid crystalline optically birefringent starch granules to the plants naturally growing in the stand exposed to the sunlight and the atmosphere.

The following examples are presented, not by way of limitation of the scope of the invention, but to illustrate to those skilled in the art, the practice of various of the presently preferred embodiments of the invention and to distinguish the invention from the prior art.

EXAMPLE 1

A two hundred acre field of healthy russet potato plants was selected. As used herein, a plant is healthy if:

(1) The plant's foliage has its normal expected color. For example, if the leaves of a potato plant have their normal green color, the plant is healthy. If the leaves are yellow or brown, the plant is not healthy.

(2) The plant is in its normal expected orientation. If a corn stalk is in its normal upright orientation, the corn is healthy. If the stalk is lying on the ground the corn stalk is not healthy.

(3) The plant has the capacity to carry out normally photosynthesis, respiration, and water movement. If, for example, a fungus blocks the plant's water passages then the plant cannot carry out water movement in a normal manner and the plant is not healthy. If there is a poison in the plant the plant may not be able to carry out respiration or photosynthesis, in which case the plant is not healthy. All plants and other living things are to some degree inhabited by pathogens. In many cases such pathogens do not prevent either the normal photosynthesis, respiration, and water movement by a plant or the normal growth of the plant. Consequently, the mere presence of pathogens on a plant does not necessarily mean the plant is not healthy.

(4) The plant is growing naturally. As used herein, growing naturally means a plant is using water and nutrients from the ground, carbon dioxide from the air, and sunlight to grow.

(5) The plant roots are obtaining from the ground sufficient oxygen for the plant to grow normally. If the ground is compacted or flooded, the plant roots may not be able to obtain sufficient oxygen, in which case the plant may be inhibited from carrying out normally its biological functions of photosynthesis, respiration, and water movement. Without a sufficient supply of oxygen for its roots, the plant will eventually die.

The field was located out-of-doors in Idaho during the summer. The plants in the field were arranged in typical cultivated fashion in parallel equally spaced apart rows. Prior to harvesting potatoes produced by the plants, each plant in the field generally received about the same amount of water, of fertilizer, and of pesticides during its vegetative and reproductive growth cycles. However, an aqueous dispersion of raw crystalline birefringent potato starch granules was applied to twenty acres of the field in the following manner:

One and one-half pounds of potato starch granules was applied per acre. Each one-half pound of starch granules was mixed with fifteen gallons of water and 0.0375 gallons of non-ionic surfactant. The non-ionic surfactant includes molecules having a hydrophobic end which attaches to the fatty acid of a leaf and having a hydrophillic end which attaches to water. The surfactant performs the functions of helping penetrate the waxy barrier on the epidermal surface of a leaf, of helping the water spread over the surface of the leaf to increase the surface area of water contacting the leaf surface, and of helping the starch granules adhere to and remain on the surface of the leaf. The non-ionic surfactant can comprise a petroleum distillate product, soy bean product, or any other product which at least performs the function of helping penetrate the waxy barrier on the epidermal surface of a leaf. Such surfactants are readily available through a variety of distributors. The particular surfactant utilized with the potato starch particles was, however, HERBIMAX. HERBIMAX (™) is a non-ionic oil surfactant adjuvant made by Loveland Industries, Inc. of Greeley, Colo. 80632 (Phone No. 356-8920). HERBIMAX includes 83% by weight petroleum hydrocarbons, namely, light paraffinic distillate odorless aliphatic petroleum solvent. HERBIMAX also includes 17% by weight omega hydroxpoly oxyethylene surfactant.

If flour is admixed with water it forms lumps which clog a sprayer. Such a problem is inherent in utilizing starch. I premixed and agitated each one-half pound of starch granules with about one-half gallon of water in a plastic bag until the starch granules were dispersed in the water. The starch granule—water mixture was then mixed with fourteen and one-half gallons of water and 0.0375 gallons of surfactant in a sprayer tank which was mounted on my back. Walking while the sprayer was mounted on my back continuously imparted motion to water in the sprayer tank and functioned to keep the starch in suspension in the tank. The starch could, of course, be put in a sprayer tank equipped with a mechanical mixer of other means of forming and maintaining a dispersion of starch granules in water. Larger or smaller sprayer tanks can be utilized. After all the aqueous starch granule—water—surfactant mixture in the fifteen gallon sprayer tank was applied evenly to potato plants in a selected acre in the twenty acre area being sprayed, another one-half pound of starch granules was used to recharge the sprayer tank a second time with a starch granule—water—surfactant mixture using the mixing procedure described above (i.e., one-half pound of starch granules is mixed with fifteen gallons of water and 0.0375 gallons of surfactant). The resulting mixture was applied generally uniformly over the same selected acre to potato plants in the acre. Finally, the remaining one-half pound of starch granules was used to recharge the sprayer tank a third time with a starch granule—water—surfactant mixture (0.5 pound of starch granules+fifteen gallons of water+0.0375 gallons of surfactant) using the mixing procedure described above. The resulting mixture was applied generally uniformly over the same selected acre to potato plants in the acre. The foregoing procedure of preparing three separate sprayer tank starch granule—water—surfactant mixtures (each such mixture including 0.5 pound of starch granules+fifteen gallons of water+0.0375 gallons of surfactant) and applying each of the three mixtures to the same selected acre was repeated for each of the remaining nineteen acres; i.e., was repeated until each one of the twenty acres had been sprayed three times with fifteen gallons of starch granule—water—surfactant mixture. Each fifteen gallon batch of the starch granule—water—surfactant mixture included one-half pound of starch. Spraying each acre three times succeeded in drenching or wetting the majority of leaves in each potato plant. As would be appreciated by those of skill in the art, the spray process can be shortened and simplified by using a larger spray tank to produce larger volumes of the desired starch granule—water—surfactant mixture. It is also presently believed not necessary to wet the majority of leaves in a plant because wetting just a single leaf will benefit the plant.

The starch granule—water—surfactant mixture was applied foliarly to the potato plants in the morning. When the starch granule—water—surfactant mixture was applied to the potato plants, the ambient temperature was 82 degrees F., the skies were partly cloudy such that the plants were subjected to about four hours of direct sunlight during the remainder of the day. At the specific time the mixture was applied, the plants were subjected to direct sunlight and continued to be subjected to direct sunlight for at least five minutes after the mixture was applied. The ground was moist and the plants were generating about one to two of pressure to draw water from the ground into the plants. The starch granule—water—surfactant mixture was applied about two and one-half weeks prior to row closure. Row closure occurs when the plants in two adjacent parallel rows grow sufficiently to cover substantially all or a significant portion of the ground between the rows. Row closure is advantageous because it shields the ground between the rows from the sun and significantly inhibits or prevents the growth of weeds. Row closure occurs and is readily recognized by farmers regardless of whether rows are twelve inches apart, as is common with irrigated crops, or are eighteen inches apart, as is common on "dry land" (i.e., on land which receives less than 18 inches of rainfall a year). Row closure generally occurs about two to two and one-half weeks after the first flowers appear on a plant.

After the starch granule—water—surfactant mixture was applied foliarly, the plants were allowed to complete their vegetative and/or reproductive growth cycles and some weeks later the russet potatoes were harvested. As the plants in the 200 acre field completed their growth cycle prior to harvest, the plants sprayed foliarly with the starch granule—water—surfactant mixture did not appear different from the plants not sprayed with starch granule—water—surfactant mixture. The plants sprayed with starch granule—water—surfactant were generally the same height and color as the plants not sprayed with the mixture and the number of flowers produced on the plants sprayed with the starch granule—water—surfactant mixture appeared to be about the same as the number of flowers produced on plants not sprayed with the mixture.

Results

The twenty acres of potatoes which were foliarly sprayed with the starch granule—water—surfactant mixture produced 328 hundred weight per acre of russet potatoes. The remaining one hundred and eighty acres which was not sprayed with starch granule—water—surfactant mixture produced only 295 hundred weight per acre of potatoes. Consequently, spraying the potato plants with the starch granule—water—surfactant mixture produced an 11% increase in the yield of potatoes.

The amount of starch utilized per fifteen gallons of water is in the range of 0.1 pounds to 10 pounds, preferably about 0.5 pounds to four pounds.

Although the surfactant may be omitted in the practice of the invention, it is presently believed that the surfactant performs an important function in helping the starch granules penetrate the waxy barrier on the epidermal leaf surface so that the granules enter the leaf through anticlinal cell walls. From 0.00005 to 0.1000 gallon, preferably 0.0010 to 0.0100 gallon of surfactant is added to each gallon of water utilized to make the starch granule—water—surfactant mixture. If desired, minerals and other compositions can be included in the mixture.

EXAMPLE 2

Example 1 is repeated, except the sky is overcast instead of party cloudy. The results are similar except that the twenty acres sprayed with starch granule—water—surfactant mixture produce only 310 hundred weight per acre of russet potatoes. When the mixture is applied it is preferred that the plants be subjected to direct sunlight for at least several hours on the day on which the starch granule—water—surfactant mixture is applied. Most preferably, the plants are subjected to direct sunlight at the time the starch granule—water—surfactant mixture is foliarly applied, as well as for five minutes, for ten minutes, or for five to ten minutes after the mixture is applied.

Although I do not wish to be bound by the following mechanism, according to my present understanding, it appears that the raw starch granules facilitate the use of starch by the leaves on the plants because the particles are clear or translucent and permit light to pass through the particles into the leaves to power photosynthesis and respiration of the plant to facilitate entry of the particles through transclinal (or paraclinal) epidermal cell walls. In addition, when the birefrigent starch granules double refract light entering the granules, the granules attenuate to some degree the intensity of the light. This is beneficial on hot days because it helps reduce the heating of leaves and concomitant loss of moisture from the leaves. The granules therefore provide some shade for the portion of the leaf covered by the particles while still permitting sunlight to power photosynthesis and respiration of the leaf. For these reasons, and for the surprising results achieved with raw crystalline birefringent starch granules, such raw transparent or translucent birefringent starch granules are preferred in the practice of the invention.

EXAMPLE 3

Example 1 is repeated, except the ground is dry and the plants are generating eight atmospheres of pressure to draw water from the ground. The results are similar except that the twenty acres sprayed with starch granule—water—surfactant mixture produce only 296 hundred weight per acre of russet potatoes. When the starch granule—water—surfactant mixture is foliarly applied, the plants should be generating less than about seven atmospheres of pressure to draw water from the ground, preferably less than about four atmospheres of pressure. When the soil has a Field Capacity of water, a plant need only generate about one-third atmosphere of pressure to draw water from the soil into the plant.

EXAMPLE 4

Example 1 is repeated, except the ground is drier and the plants are generating three to four atmospheres of pressure to draw water from the ground. The results are similar.

EXAMPLE 5

Example 1 is repeated, except the ambient temperature is 50 degrees F. instead of 82 degrees F. The results are similar except that the twenty acres sprayed with the starch granule—water—surfactant mixture produce only 297 hundred weight per acre of russet potatoes.

EXAMPLE 6

Example 1 is repeated, except the ambient temperature is 65 degrees F. instead of 82 degrees F. The results are similar.

EXAMPLE 7

Example 1 is repeated, except that the starch granule—water—surfactant mixture is applied about five weeks before row closure instead of two and one-half weeks before row closure. Similar results are obtained.

EXAMPLE 8

Example 1 is repeated, except that the starch granule—water—surfactant mixture is applied about seven weeks before row closure instead of two and one-half weeks before row closure. The results are similar except that the twenty acres sprayed with the starch granule—water—surfactant mixture produce a yield of 295 hundred weight per acre.

EXAMPLE 9

Example 1 is repeated, except that the starch granule—water—surfactant mixture is applied about one week after row closure instead of two and one-half weeks before row closure. The twenty acres sprayed with the starch granule—water—surfactant mixture produce a yield of 295 hundred weight per acre. In the practice of the invention, the starch granule—water—surfactant mixture is applied within about five weeks of row closure, preferably within about one to three weeks of row closure. Applying the starch granule—water—surfactant mixture after row closure does not presently appear to produce significant yield increases compared to growing plants without applying the starch granule—water—surfactant mixture.

EXAMPLE 10

A one hundred acre irrigated field of healthy barley plants was selected. The field was located out-of-doors in Idaho during the summer. The plants in the field were arranged in typical cultivated fashion in parallel equally spaced apart rows. Prior to harvesting barley produced by the plants, each plant in the field generally received about the same amount of water, of fertilizer, and of pesticides during its vegetative and reproductive growth cycles. However, an aqueous dispersion of raw crystalline birefringent potato starch granules was applied to twenty acres of the field. One and one-half pounds of potato starch granules was applied per acre. Each one-half pound of starch granules was mixed with fifteen gallons of water and 0.0375 gallons of non-ionic surfactant. The particular surfactant utilized with the potato starch particles was HERBIMAX. HERBIMAX is described above in Example 1.

One-half pound of starch was premixed and agitated with about one-half gallon of water in a plastic bag until the starch was dispersed in the water. The starch—water mixture was then mixed with fourteen and one-half gallons of water and 0.0375 gallon of surfactant in a sprayer tank which was mounted on my back. Walking while the sprayer was mounted on my back continuously imparted motion to water in the sprayer tank and functioned to keep the starch in suspension and dispersed in the water in the tank. After all the aqueous starch granule—water—surfactant mixture in the fifteen gallon sprayer tank was applied evenly to barley plants in a selected acre in the twenty acre area being sprayed, another one-half pound of starch granules was used to recharge the sprayer tank a second time with a starch granule—water—surfactant mixture (i.e., 0.5 pound starch granules+15 pounds of water+0.0375 gallon surfactant) using the mixing procedure described above. The resulting mixture was applied generally uniformly over the same selected acre to barley plants in the acre. Finally, the remaining one-half pound of starch granules was used to recharge the fifteen gallon sprayer tank a third time with a starch granule—water—surfactant mixture using the mixing procedure described above. The resulting mixture was applied generally uniformly over the same selected acre to barley plants in the acre. The foregoing procedure of preparing three separate sprayer tank starch granule—water—surfactant fifteen gallon mixtures and applying each of the three mixtures to the same selected acre was repeated for each of the remaining nineteen acres; i.e., was repeated until each one of the twenty acres had been sprayed three times with approximately fifteen gallons of starch granule—water—surfactant mixture. Each fifteen gallon mixture included one-half pound of starch granules, 15 pounds of water, and 0.0375 gallons of surfactant. Spraying each acre three time succeeded in drenching or wetting the majority of leaves in each barley plant.

The starch granule—water—surfactant mixture was applied in the morning. When the starch granule—water—surfactant mixture was applied, the ambient temperature was 76 degrees F., the skies were clear such that the plants were subjected to about seven hours of direct sunlight during the remainder of the day. The ground was moist and the barley plants were generating about one to two atmospheres of pressure to draw water from the ground into the plants. The starch granule—water—surfactant mixture was applied about two and one-half weeks prior to row closure. After the starch granule—water—surfactant mixture was applied, the plants were allowed to complete their vegetative and/or reproductive growth cycles and some weeks later the barley grain was harvested. As the plants in the field completed their growth cycle prior to harvest, the plants sprayed with starch granule—water—surfactant mixture did not appear different from the plants not sprayed with the mixture. The plants sprayed with starch granule—water—surfactant mixture were generally the same height and color as the plants not sprayed with the mixture and the number of flowers produced on the plants sprayed with the mixture appeared to be about the same as the number of flowers produced on plants not sprayed with the starch granule—water—surfactant mixture.

Results

The twenty acres of barley plants which foliarly were sprayed with the starch granule—water—surfactant mixture produced 134 bushels per acre of barley grain. The remaining eighty acres which were not sprayed with the starch granule—water—surfactant mixture produced only 120 bushels per acre of barley. Consequently spraying the barley plants with the starch granule—water—surfactant mixture produced an 11.7% increase in the yield of barley grain.

EXAMPLE 11

Example 10 is repeated, except the sky is overcast instead of clear. The results are similar except that the twenty acres sprayed with the starch granule—water—surfactant mixture produce only 126 bushels of grain per acre.

EXAMPLE 12

Example 10 is repeated, except the ground is quite dry and the plants are generating seven atmospheres of pressure to draw water from the ground. The results are similar except that the twenty acres sprayed with starch granule—water—surfactant mixture produce only 121 bushels per acre of grain.

EXAMPLE 13

Example 10 is repeated, except the ground is drier and the plants are generating three to four atmospheres of pressure to draw water from the ground. The results are similar.

EXAMPLE 14

Example 10 is repeated, except the ambient temperature is 57 degrees F. instead of 76 degrees F. The results are similar except that the twenty acres sprayed with starch granule—water—surfactant mixture produce only 122 bushels of grain per acre.

EXAMPLE 15

Example 10 is repeated, except the ambient temperature is 100 degrees F. instead of 76 degrees F. The results are similar.

EXAMPLE 16

Example 10 is repeated, except that the starch granule—water—surfactant mixture is applied about five weeks before row closure instead of two and one-half weeks before row closure. Similar results are obtained.

EXAMPLE 17

Example 10 is repeated, except that the starch granules—water—surfactant mixture is applied about seven weeks before row closure instead of two and one-half weeks before row closure. The twenty acres sprayed with the starch granule—water—surfactant mixture produce a yield of 120 bushels of barley per acre.

EXAMPLE 18

Example 10 is repeated, except that the starch granule—water—surfactant mixture is applied about one week after row closure instead of two and one-half weeks before row closure. The twenty acres sprayed with the starch granule—water—surfactant mixture produce a yield of 120 bushels of barley per acre.

EXAMPLE 19

A three hundred and seventy-five acre field of healthy corn plants was selected. The field was located out-of-doors in Missouri during the summer. The plants in the field were arranged in typical cultivated fashion in parallel equally spaced apart rows. Prior to harvesting corn produced by the plants, each plant in the field generally received about the same amount of water, of fertilizer, and of pesticides during its vegetative and reproductive growth cycles. However, an aqueous dispersion of raw crystalline birefringent potato starch granules was applied foliarly to forty acres of the field. The granules were applied by spraying foliarly an aqueous mixture including potato starch, water, and surfactant until about one and one-half pounds of starch had been evenly applied over each acre in the forty acres selected. Each batch of the aqueous mixture included about one-half pound of raw crystalline birefringent potato starch granules, fifteen gallons of water, and about 0.0375 gallons of HERBIMAX (™) surfactant. The starch granules were generally uniformly dispersed in the water when the aqueous mixture was foliarly sprayed onto corn plants. The aqueous mixture was foliarly sprayed such that the majority of leaves in each corn plant were at least partially wetted. The starch granule—surfactant aqueous mixture was applied in the morning. When the aqueous mixture was applied, the ambient temperature was 88 degrees F., and the skies were clear such that the plants were subjected to about seven hours of direct sunlight during the remainder of the day. The ground was fairly moist and the plants were generating about three to four atmospheres of pressure to draw water from the ground into the plants. The starch granule—surfactant aqueous mixture was applied about three weeks prior to row closure. After the starch was applied, the plants were allowed to complete their vegetative and/or reproductive growth cycles and some weeks later the corn was harvested. As the plants in the field completed their growth cycle prior to harvest, the plants sprayed with the starch granule—surfactant aqueous mixture did not appear different from the plants not sprayed with the aqueous mixture. The plants sprayed with the aqueous mixture were generally the same height and color as the plants not sprayed with the aqueous mixture and the number of flowers produced on the plants sprayed with the aqueous mixtures appeared to be about the same as the number of flowers produced on plants not sprayed with the starch granule—surfactant aqueous mixture.

Results

The forty acres of corn which were foliarly sprayed with the starch granule—surfactant aqueous mixture produced 153 bushels per acre of corn. The remaining three hundred and thirty-five acres which were not sprayed with the starch granule—surfactant aqueous mixture produced only 143 bushels per acre of corn. Consequently, spraying corn plants with the starch granule—surfactant aqueous mixture produced a 7% increase in the yield of corn.

EXAMPLE 20

Example 19 is repeated, except the sky is overcast instead of clear. The results are similar except that the forty acres sprayed with the starch granule—surfactant aqueous mixture produce only 147 bushels of corn per acre.

EXAMPLE 21

Example 19 is repeated, except the ground is quite dry and the plants are generating seven and one-half atmospheres of pressure to draw water from the ground. The results are similar except that the forty acres sprayed with the starch granule—surfactant aqueous mixture produce only 143 bushels per acre of corn.

EXAMPLE 22

Example 19 is repeated, except the ground is drier and the plants are generating three to four atmospheres of pressure to draw water from the ground. The results are similar.

EXAMPLE 23

Example 19 is repeated, except the ambient temperature is 72 degrees F. instead of 88 degrees F. The results are similar.

EXAMPLE 24

Example 19 is repeated, except the ambient temperature is 52 degrees F. instead of 88 degrees F. The results are similar except that the forty acres sprayed with the starch granule—surfactant aqueous mixture only produce 144 bushels of corn per acre.

EXAMPLE 25

Example 19 is repeated, except that the starch granule—surfactant aqueous mixture is applied about five days before row closure instead of two and one-half weeks before row closure. Similar results are obtained.

EXAMPLE 26

Example 19 is repeated, except that the starch granule—surfactant aqueous mixture is applied about four days after row closure instead of two and one-half weeks before row closure. The forty acres sprayed with the starch granule—surfactant aqueous mixture produce a yield of 144 bushels of corn per acre.

EXAMPLE 27

Example 19 is repeated, except that the starch granule—surfactant aqueous mixture is applied about one week (seven days) after row closure instead of two and one-half weeks before row closure. The forty acres sprayed with the starch granule—surfactant aqueous mixture produce a yield of 142 bushels per acre.

EXAMPLE 28

A 881 acre field of healthy sunflower plants was selected. The field was located out-of-doors in Colorado during the summer. The plants in the field were arranged in typical cultivated fashion in parallel equally spaced apart rows. Prior to harvesting the seeds produced by the plants, each plant in the field generally received about the same amount of water, of fertilizer, and of pesticides during its vegetative and reproductive growth cycles. However, an aqueous dispersion of raw crystalline birefringent potato starch granules was applied foliarly to 240 acres of the field. The granules were applied by spraying foliarly an aqueous mixture including potato starch, water, and surfactant until about one and one-half pounds of starch had been evenly applied over each acre in the 240 acres selected. Each batch of the aqueous mixture included about one-half pound of raw crystalline birefringent potato starch granules, fifteen gallons of water, and about 0.0375 gallons of HERBIMAX (™) surfactant. The starch granules were generally uniformly dispersed in the water when the aqueous mixture was foliarly sprayed onto sunflower plants. The aqueous mixture was foliarly sprayed such that the majority of leaves in each sunflower plant were at least partially wetted. The starch granule—surfactant aqueous mixture was applied in the morning. When the starch granule—surfactant aqueous mixture was applied, the ambient temperature was 73 degrees F., the skies were clear such that the plants were subjected to about nine hours of direct sunlight during the remainder of the day. The ground was moist and the plants were generating about two to three atmospheres of pressure to draw water from the ground into the plants. The starch granule—surfactant aqueous mixture was applied about three weeks prior to row closure. After the aqueous mixture was applied, the plants were allowed to complete their vegetative and/or reproductive growth cycles and some weeks later the sunflower seeds were harvested and pressed to produce oil. As the plants in the field completed their growth cycle prior to harvest, the plants sprayed with the starch granule—surfactant mixture did not appear different from the plants not sprayed with the aqueous mixture. The plants sprayed with the aqueous mixture were generally the same height and color as the plants not sprayed with the aqueous mixture and the number of flowers produced on the plants sprayed with the aqueous mixture appeared to be about the same as the number of flowers produced on plants not sprayed with the starch granule—surfactant aqueous mixture.

Results

The 240 acres of sunflower plants which foliarly received the starch granule—surfactant aqueous mixture produced 1220 pounds of sunflower oil per acre of sunflower plants. The remaining 641 acres which were not sprayed with the starch granule—surfactant aqueous mixture produced only 938 pounds of oil per acre of sunflower plants. Consequently, spraying sunflower plant foliarly with the starch granule—surfactant aqueous mixture produced a 30% increase in the yield of oil.

EXAMPLE 29

Example 28 is repeated, except the sky is partly cloudy instead of clear. The results are similar except that the 240 acres sprayed with the starch granule—surfactant aqueous mixture produce only 1104 pounds of sunflower oil per acre of sunflower plants.

EXAMPLE 30

Example 28 is repeated, except the ground is quite dry and the plants are generating seven and one-half atmospheres of pressure to draw water from the ground. The results are similar except that the 240 acres sprayed with the starch granule—surfactant aqueous mixture produces only 936 pounds of oil per acre of sunflower plants.

EXAMPLE 31

Example 28 is repeated, except the ground is drier and the plants are generating four to five atmospheres of pressure to draw water from the ground. The results are similar.

EXAMPLE 32

Example 28 is repeated, except the ambient temperature is 96 degrees F. instead of 73 degrees. The results are similar.

EXAMPLE 33

Example 28 is repeated, except the ambient temperature is 45 degrees F. instead of 73 degrees F. The results are similar except that the forty acres sprayed with the starch granule—surfactant aqueous mixture only produces 938 pounds of sunflower oil per acre of sunflower plants.

EXAMPLE 34

Example 28 is repeated, except that the starch granule—surfactant aqueous mixture is applied about two days before row closure instead of three weeks before row closure. Similar results are obtained.

EXAMPLE 35

Example 28 is repeated, except that the starch granule—surfactant aqueous mixture is applied about three days after row closure instead of three weeks before row closure. The forty acres sprayed with the starch granule—surfactant aqueous mixture produce a yield of 939 pounds of sunflower oil per acre of sunflower plants.

EXAMPLE 36

Examples 1 to 35 are repeated except that raw crystalline birefringent rice starch granules are utilized in place of the potato starch granules. Similar results are obtained in each of Examples 1 to 35.

EXAMPLE 37

Examples 1 to 35 are repeated except that raw crystalline birefringent sorghum starch granules are utilized in place of the potato starch granules. Similar results are obtained in each of Examples 1 to 35.

EXAMPLE 38

Examples 1 to 35 are repeated except that raw crystalline birefringent corn starch granules are utilized in place of the potato starch granules. Similar results are obtained in each of Examples 1 to 35.

EXAMPLE 39

Examples 1 to 35 are repeated except that raw crystalline birefringent waxy maize starch granules are utilized in place of the potato starch granules. Similar results are obtained in each of Example 1 to 35.

EXAMPLE 40

Examples 1 to 35 are repeated except that only one-half pound of raw crystalline birefringent potato starch granules is applied per acre instead of one and one-half pounds per acre. Similar results are obtained in each of Examples 1 to 35. However, in Examples 1,2, 4, 6, 7, 10, 11, 13, 15, 16, 19, 20, 22, 23, 25, 28, 29, 31, 32, 34 the yields from plants foliarly sprayed with the starch granule—surfactant aqueous mixture, while still greater than the yields achieved on plants on which the starch granule—surfactant aqueous mixture is not applied, are somewhat less.

EXAMPLE 41

Examples 1 to 35 are repeated except that four pounds of raw crystalline birefringent potato starch granules is applied per acre instead of one and one-half pounds per acre. Similar results are obtained in each of Examples 1 to 35. However, in Examples 1,2, 4, 6, 7, 10, 11, 13, 15, 16, 19, 20, 22, 23, 25, 28, 29, 31, 32, 34 the yields from plants foliarly sprayed with the starch granule—surfactant aqueous mixture are somewhat greater.

EXAMPLE 42

Examples 1 to 35 are repeated except that six pounds of raw crystalline birefringent potato starch granules is applied per acre instead of one and one-half pounds per acre. Similar results are obtained in each of Examples 1 to 35. However, in Examples 1, 2, 3, 6, 7, 10, 11, 13, 15, 16, 19, 20, 22, 23, 25, 28, 29, 31, 32, 34 the yields from plants foliarly sprayed with the starch granule—surfactant aqueous mixture are somewhat greater.

EXAMPLE 43

Examples 1 to 35 are repeated except that partially gelatinized potato starch granules are utilized in place of the raw potato starch granules. Similar results are obtained. The partially gelatinized potato starch granules comprise raw potato starch granules which have been partially hydrated and have therefore swelled from their original size. However, the partially gelatinized potato starch granules are still crystalline and exhibit birefringence. As used herein, crystalline starch granules are starch granules which are partially crystalline and partially amorphous. Raw starch granules include both crystalline and amorphous phases. For example, raw corn starch granules are each about 40% crystalline as determined by X-ray diffraction. Raw waxy maize starch granules are each about 40% crystalline, raw rice starch granules are each about 38% crystalline, raw tapioca starch granules are each about 38% crystalline, raw sorghum starch granules are each about 37% crystalline, raw potato starch granules are each about 28% crystalline, and raw high-amylose corn starch particles are each about 22% crystalline. The crystalline regions in granular starches impart water insolubility in cold water. The partial crystallinities in granular starches is due to branch points, chain folding, and places in the starch granules where the molecules are simply in disarray.

As used herein, raw starch granules are starch granules which have been separated from the plant in which they were produced. Raw starch granules are crystalline, are water-insoluble, are dense, are hydrated to a small degree, are birefringent, are (in ordinary light) clear or translucent, are colorless, and have a mean refractive index of about 1.5. Raw starch granules are nature's almost universal form for packaging and storing carbohydrate in green plants.

EXAMPLE 44

Example 1 to 35 are repeated except that the surfactant is not utilized. Similar results are obtained in each of Examples 1 to 35. However, in Examples 1,2, 4, 6, 7, 10, 11, 13, 15, 16, 19, 20, 22, 23, 25, 28, 29, 31, 32, 34 the yields from plants foliarly sprayed with the starch granule—surfactant aqueous mixture is significantly less, though still greater than the yields from plants not foliarly sprayed with the starch granule aqueous mixture.

Raw crystalline birefringent starch granules typically cost about $800.00 per 2000 pounds.

The leaves of a plant typically include a plurality of epidermal cells, a plurality of stomata for allowing carbon dioxide to enter the leaf, a plurality of food-making cells, each food-making cell including a plurality of chloroplasts, a plurality of air spaces each adjacent at least one of the food-making cells, carbon dioxide in each of the air spaces, water vapor in each of the air spaces, xylem for carrying water, and phloem for carrying food produced by the leaf. The food making cells include palisade cells and spongy cells. The leaf also includes veins and supporting fibers. The epidermal cells are found in the upper epidermis and the lower epidermis of a leaf. The epidermis is covered by a waxy coating call the cuticle. Each stomata is surrounded by a pair of curved, bean-shaped guard cells. The guard cells can swell and relax. A stomata or pore closes when its guard cells relax. The stomata opens when the guard cells swell. When the stomata opens, carbon dioxide enters the leaf.

It is possible that forms of starch other than crystalline birefringent starch granules will work in the practice of the invention. For example, various forms of modified starch may also produce significant increases in the yields associated with a plant. However, to date, only crystalline birefringent starch granules have been tested and shown to produce surprising and unexpected increases in the yield of plants.

Having described my invention in such terms as to enable those skilled in the art to understand and practice it, and having identified the presently preferred embodiments thereof,

I claim:

1. A method for treating a stand of plants growing by natural processes and exposed to direct sunlight and an atmosphere of air to improve the yield of said plants, each of said plants including at least one leaf including
   a plurality of epidermal cells,
   a plurality of stomata for allowing carbon dioxide to enter the leaf,
   a plurality of food-making cells, each food-making cell including a plurality of chloroplasts,
   a plurality of air spaces each adjacent at least one of the food-making cells,
   carbon dioxide in each of the air spaces,
   water vapor in each of the air spaces,
   xylem for carrying water, and
   phloem for carrying food produced by the leaf;
said method comprising the step of applying foliarly to contact at least some of said epidermal cells a plurality of crystalline optically birefringent starch granules to said plants naturally growing in said stand exposed to said sunlight and said atmosphere, each of said granules
   (a) including a crystalline phase and an amorphous phase; and
   (b) being one of a pair including
       (i) clear, and
       (ii) translucent.

2. A method for treating a stand of plants growing by natural processes to improve the yield of said plants, each of said plants including at least one leaf including
   a plurality of epidermal cells,
   a plurality of stomata for allowing carbon dioxide to enter the leaf,
   a plurality of food-making cells, each food-making cell including a plurality of chloroplasts,
   a plurality of air spaces each adjacent at least one of the food-making cells,
   carbon dioxide in each of the air spaces,
   water vapor in each of the air spaces,
   xylem for carrying water, and
   phloem for carrying food produced by the leaf;
said method comprising the step of, when the stand of plants exerts less than six atmospheres of pressure to draw water from the ground and is exposed to direct sunlight and an atmosphere of air having an ambient temperature in the range of 65 degrees F. to 105 degrees F., applying foliarly to contact at least some of said epidermal cells a plurality of solid crystalline optically birefringent starch granules to said plants, each of said granules
   (a) including a crystalline phase and an amorphous phase; and
   (b) being one of a pair including
       (i) clear, and
       (ii) translucent.

3. A method for treating a stand of potato plants growing by natural processes and exposed to direct sunlight and an atmosphere of air to improve the yield of said plants, each of said plants including at least one leaf including
   a plurality of epidermal cells,
   a plurality of stomata for allowing carbon dioxide to enter the leaf,
   a plurality of food-making cells, each food-making cell including a plurality of chloroplasts,
   a plurality of air spaces each adjacent at least one of the food-making cells,
   carbon dioxide in each of the air spaces,
   water vapor in each of the air spaces,
   xylem for carrying water, and
   phloem for carrying food produced by the leaf;
said method comprising the step of, less than five weeks before row closure, applying foliarly to contact said epidermal cells of said potato plants a plurality of solid crystalline optically birefringent starch granules to said plants naturally growing in said stand exposed to said sunlight and said atmosphere, each of said granules
   (a) including a crystalline phase and an amorphous phase;
   (b) being one of a pair including
       (i) clear, and
       (ii) translucent; and,
   (c) having a mean refractive index of about 1.5.

* * * * *